United States Patent
Etienne et al.

(10) Patent No.: US 10,023,086 B2
(45) Date of Patent: Jul. 17, 2018

(54) CONNECTION OF A MOTOR VEHICLE SEAT TRIM ELEMENT TO A COVER PART

(71) Applicant: FAURECIA SIEGES D'AUTOMOBILE, Nanterre (FR)

(72) Inventors: Fabrice Etienne, Bavilliers (FR); Julie Thomas, Les Aynans (FR)

(73) Assignee: FAURECIA SIEGES D'AUTOMOBILE, Nanterre (FR)

( * ) Notice: Subject to any disclaimer, the term of this patent is extended or adjusted under 35 U.S.C. 154(b) by 225 days.

(21) Appl. No.: 15/194,668

(22) Filed: Jun. 28, 2016

(65) Prior Publication Data

US 2016/0375806 A1 Dec. 29, 2016

(30) Foreign Application Priority Data

Jun. 29, 2015 (FR) ...................................... 15 56054

(51) Int. Cl.
*B60N 2/58* (2006.01)

(52) U.S. Cl.
CPC ......... *B60N 2/5825* (2013.01); *B60N 2/5891* (2013.01)

(58) Field of Classification Search
None
See application file for complete search history.

(56) References Cited

U.S. PATENT DOCUMENTS

| | | | | |
|---|---|---|---|---|
| 3,647,260 A * | 3/1972 | Grant | ..................... | A47C 7/185 297/229 |
| 5,195,222 A * | 3/1993 | Rink | .................... | A47C 31/023 24/581.1 |
| 5,499,859 A * | 3/1996 | Angell | ..................... | B60N 2/70 297/218.3 |
| 5,630,643 A * | 5/1997 | Scholten | .................. | A47C 3/12 297/218.2 |
| 2008/0224509 A1 | 9/2008 | Demick | | |
| 2014/0042792 A1* | 2/2014 | Kajiwara | ............. | B60N 2/5825 297/463.1 |
| 2014/0183925 A1 | 7/2014 | Clauser | | |
| 2017/0303614 A1* | 10/2017 | McMahon | .............. | A41F 19/00 |
| 2018/0037144 A1* | 2/2018 | Makita | ................. | B60N 2/5825 |

FOREIGN PATENT DOCUMENTS

| DE | 102004040400 A1 | 4/2005 |
|---|---|---|
| WO | 2010096933 A1 | 9/2010 |

OTHER PUBLICATIONS

Preliminary Search Report for French Patent Application No. 1556054, dated May 9, 2016.

* cited by examiner

*Primary Examiner* — David E Allred
(74) *Attorney, Agent, or Firm* — Moreno IP Law LLC

(57) ABSTRACT

An element of connection between a trim element of a motor vehicle seat element and a cover part, wherein the connection element has a profiled shape having, in cross-section a first jaw and a second jaw intended to pinch together an edge of the trim element and an edge of the cover part, the connection element being one piece.

7 Claims, 2 Drawing Sheets

CONNECTION OF A MOTOR VEHICLE SEAT TRIM ELEMENT TO A COVER PART

BACKGROUND

The present disclosure generally relates to motor vehicles and, more particularly, to the connection between a trim element for a seat element (back panel of a backrest, of a headrest, lateral seat casing, etc.) and a cover part made of a covering material made of leather, of skin, of woven or nonwoven textile, of synthetic material, etc. The present disclosure more particularly relates to the forming of a trim element having its rear surface comprising a foam layer.

DISCUSSION OF PRIOR ART

Back panels of motor vehicle seats and lateral casings are usually formed by plastic injection parts, covered sheet metal (case of second row seats), a stretched lining attached to the metallic structure of the seat via plastic profiles, or also by the use of a plastic frame attached to the metallic structure or assembled with the cap of the upholstery of the front surface of the seat.

A specific category of back panels to which the present description applies comprises a foam layer which is relatively thin as compared with the thickness of the backrest, the foam layer being covered with a covering material made of leather, of skin, of woven or nonwoven textile, of synthetic material, etc., defining the apparent surface of the back panel.

An example of a seat backrest equipped with a back panel of this type is described in document FR A 2941657.

SUMMARY

An embodiment overcomes all or part of the disadvantages of known techniques for forming a seat trim element equipped with a foam layer on its rear surface.

An embodiment provides a technique for connecting such a trim element to a cover part.

Thus, an embodiment provides an element of connection between a trim element of a motor vehicle seat element and a cover part, wherein the connection element has a profiled shape having, in cross-section a first jaw and a second jaw intended to pinch together an edge of the trim element and an edge of the cover part, the connection element being one piece.

According to an embodiment, the first jaw comprises, on its inner surface, a first longitudinal tooth.

According to an embodiment, the second jaw comprises, on its inner surface, a second longitudinal tooth.

According to an embodiment, the second jaw comprises, at its free end, a cord.

An embodiment also provides a system for fastening a cover part to a trim element, comprising a plurality of connection elements, along the assembly between the trim element and the cover.

According to an embodiment, the trim element is formed of a stack formed at least of a covering material made of textile, of leather, of skin, or of a synthetic material, and of a foam layer on the back side of the covering material.

According to an embodiment, the system further comprises an element for connecting the different connection elements.

According to an embodiment, the system further comprises a profiled harpoon intended to be fastened to the edge of the cover part.

According to an embodiment, the harpoon and the first tooth cooperate.

According to an embodiment, the back side of the trim element comprises a notch for receiving said first tooth.

An embodiment also provides a motor vehicle seat element.

An embodiment also provides a motor vehicle seat comprising at least one seat element.

The foregoing and other features and advantages will be discussed in detail in the following non-limiting description of specific embodiments in connection with the accompanying drawings.

DETAILED DESCRIPTION

Figure 1:
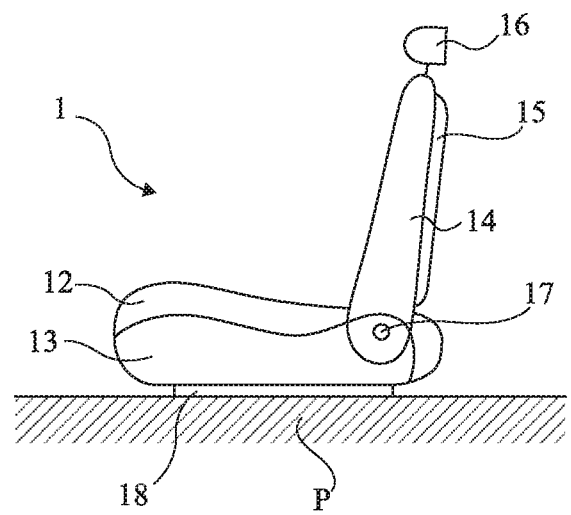
FIG. 1 is a simplified lateral view of a motor vehicle seat.

For clarity, only those steps and elements which are useful to the understanding of the described embodiments have been shown and will be detailed. In particular, the forming of the other seat elements has not been detailed, the described embodiments being compatible with any usual forming of upholstery attached to a frame.

It should be noted that, in the drawings, the structural and/or functional elements common to the different embodiments may be designated with the same reference numerals and may have identical structural, dimensional, and material properties.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred to the orientation of the drawings. Unless otherwise specified, expressions approximately, substantially, and in the order of mean to within 10%, preferably to within 5%.

FIG. 1 is a simplified lateral view of a motor vehicle seat 1. Such a seat comprises a seat bottom piece 12 having a backrest 14 jointed thereto (joint 17) and most often topped with a headrest 16. Seat bottom piece 12, backrest 14, and headrest 16 each comprise upholstery fastened to their frame, generally made of metal. The frame of seat bottom piece 12 may be connected to floor P of the vehicle by a slide rail mechanism 18. Seat 1 may also comprise one or a plurality of armrests (not shown). In the example of FIG. 1, lateral casings 13 partially cover the sides of seat bottom piece 12 and for example mask joint 17 and part of slide rails 18.

Figure 2:
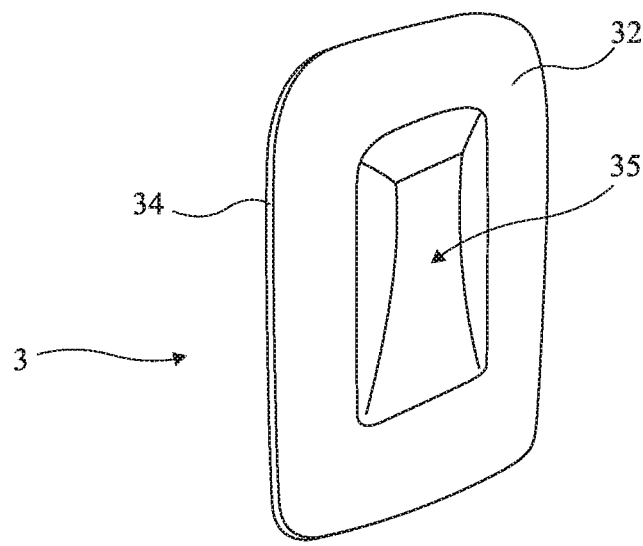
FIG. 2 is a perspective view illustrating an embodiment of a back panel of a motor vehicle seat backrest.

FIG. 2 is a perspective view of a back panel 3 of a backrest (14, FIG. 1) of the type described in above-mentioned document FR-A-2941657.

Panel 3 is formed of a stack of a covering material 32, for example, made of textile (woven or not), of leather, of skin, or of a synthetic material, and of a foam layer 34. Panel 3 defines the final shape and the aspect of the back side of the backrest (14, FIG. 1). In particular, foam layer 34 enables to give back panel 3 a stiffness greater than that of the covering material. Further, the forming of foam layer 34 enables to vary the shape of the panel, for example, in terms of thickness of foam layer 34, of curvature thereof, by forming areas recessed with respect to the apparent surface (for example, for a map pocket 35).

The advantages of this technique are, among others, that a same backrest frame may be used for different families of seats for which different back panels are desired. Further, different foam hardnesses and/or densities may be provided in the back panel, for example, according to different areas. Further, the obtaining of the final aspect requires no further action. Trim element 3 thus defines not only the shape of at least one apparent surface, but also the finish of at least this apparent surface.

A lateral casing (13, FIG. 1), when present, is similarly formed of a stack of a covering material, for example textile (woven or not), made of leather, of skin, or of synthetic material, and of a foam layer. This stack defines the final shape and the aspect of the lateral casing. Further, the foam layer enables to vary the shape of the casing, for example, in terms of thickness of the foam layer, of curvature thereof, by forming areas recessed with respect to the apparent surface (for example, to define housings for seat adjustment members).

As compared with a plastic shell (back panel or lateral seat casing), the advantages of this technique are, among others, a weight gain, an assembly by sewing to the rest of the backrest cover, and an easy manufacturing. As compared with a stretched piece of covering material, the advantages are, among others, a space gain by enabling to follow at closest the metal structure of the backrest frame. Further, different foam hardnesses and/or densities may be provided in the back panel, for example, according to areas. Back panel 3 thus defines not only the shape but also the finish of the apparent surface.

The trim element (cover element or back panel) is obtained by forming of a foam directly or indirectly arranged at the rear surface of the covering material, by means of a mold or forming press having its die and a punch defining the shapes desired for the trim element. The die defines the apparent (outer) surface of trim element 3. The punch defines the hidden (inner) surface of the trim element. The covering material is placed with its apparent surface on the die side.

The obtained trim element 3 for example has a thickness which is not necessarily uniform, in the range from 1 to 50 millimeters, preferably from 2 to 25 millimeters. The thickness may further vary according to areas.

The connection of a trim element, for example, a back panel or a lateral casing, to a cover part or to another trim element, for example, the edges of a backrest or seat bottom piece covering element, is here considered.

Figure 3:
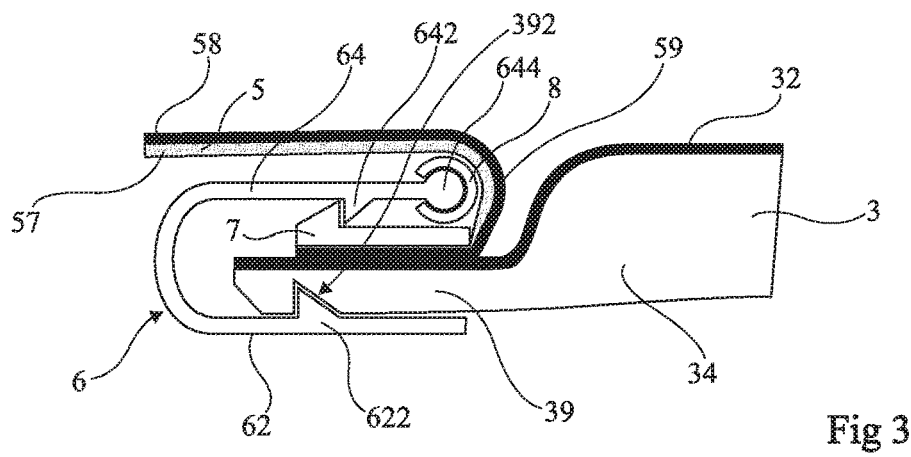
FIG. 3 is a cross-section view of an assembly element.

FIG. 3 is a cross-section view of an embodiment of an element of connection of an edge of a trim element to an edge of a cover part.

Figure 4:
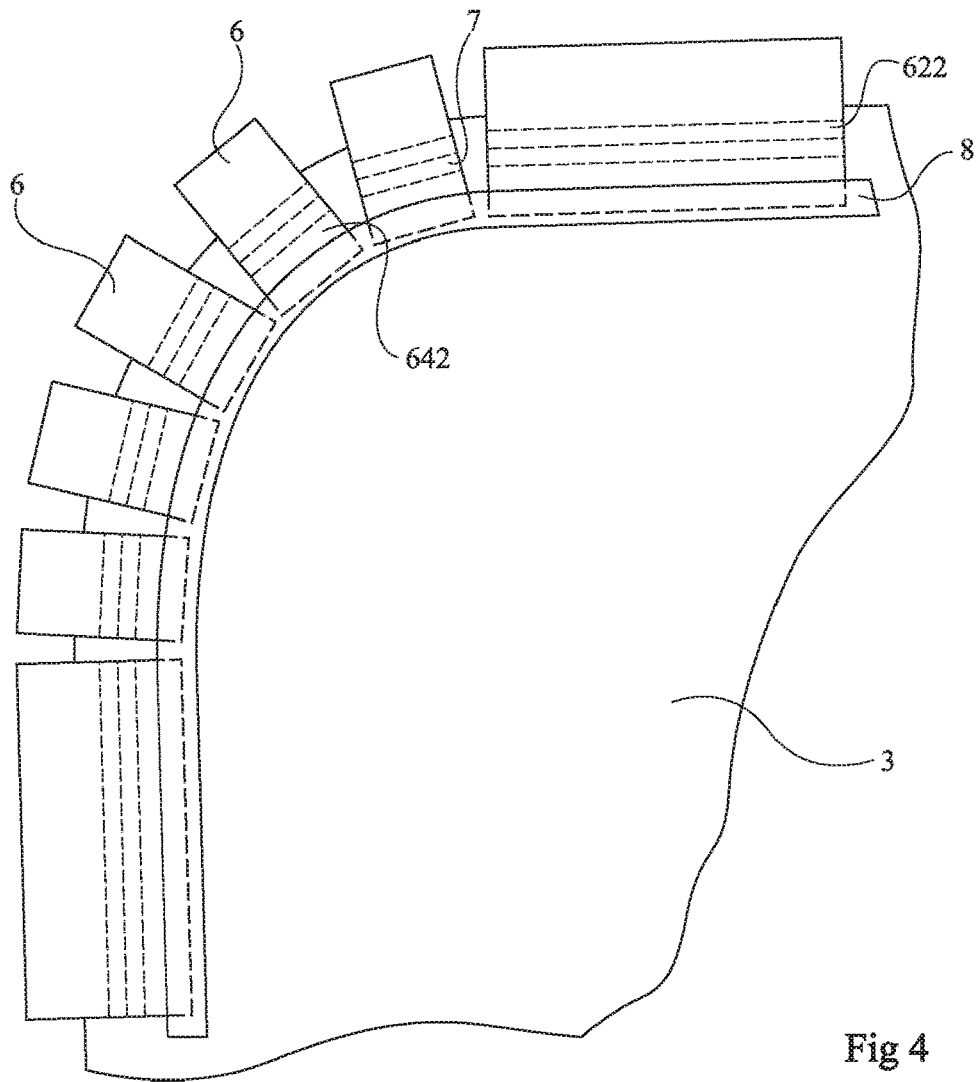
FIG. 4 is a partial top view of a trim element assembled to a cover part.

FIG. 4 is a partial top view of the formed assembly.

In the example of FIG. 3, the connection of an edge of cover 5 of the backrest to back panel 3 of the backrest is assumed. However, all that will be described hereafter more generally, and unless otherwise mentioned, applies to any connection of a cover part, possibly equipped with a thin flexible foam layer (preferably having a shore A hardness lower than approximately 30) at the rear surface, to a covering element comprising on its back side a relatively rigid foam layer, preferably of a shore A hardness greater than or equal to 50.

According to these embodiments, local connection elements 6 in the form of a clip gripping, in their jaws 62 and 64, peripheral edge 39 of back panel 3 and the peripheral edge of cover part 5, preferably, a folded edge 59 thereof, are provided. In the example shown in FIG. 3, edge 39 of the back panel is thinner than the central portion thereof. Such a thickness variation is obtained by the forming of the back panel with, at the back of covering material 32, a thinner foam layer 34 at the periphery (at the level of edge 39 to be assembled). Still in the example shown in FIG. 3, cover 5 is made of covering material 58 and of a thin flexible foam layer 57 (in the order of a few millimeters).

Each clip 6 has a profiled shape and comprises, in cross-section:

a lower jaw 62, intended to bear, with its inner surface, against the back of edge 39 of back panel 3; and an upper jaw 64 intended to bear, with its inner surface, against the back of folded edge 59 of the cover.

Preferably, the back side (foam side) of edge 39 of the back panel comprises a notch 392, defined during the forming, intended to receive a tooth 622 of jaw 62. Tooth 622 is profiled with the clip. Notch 392 is preferably continuous along edge 39.

Preferably, the inner surface of jaw 64 also comprises a profiled tooth 642, intended to cooperate with a profiled harpoon 7, sewn at the periphery of cover 5, at the level of edge 59. Profile 7 is preferably an extruded plastic profile. To follow the curves, profile 7 may be notched or cut into sections.

According to a preferred embodiment, to provide a continuity and ease the assembly, a connection is provided between the different local connection elements 6. This connection is, in the example of FIGS. 4 and 5, formed of a slotted profile 8, intended to cooperate with an end cord 644 of upper jaws 64 of clips 6. In the example of FIG. 3, cord 644 and profile 8 have circular cross-sections.

The example of FIG. 5 partially shows a rounded corner of the panel and of the cover, illustrating the fact that profile 8 is flexible, in that it can follow the pattern of the corner.

Different lengths of connection elements 6 may be provided. For example, they have lengths in the range from 2 to 10 cm.

According to an alternative embodiment, more particularly intended for the case where clips 6 have a sufficient spring effect, cord 644 and profile 8 are avoided.

Embodiments have been described. Various alterations and modifications will occur to those skilled in the art. In particular, the determination of the lengths of connection elements 6 according to the pattern to be followed is within the abilities of those skilled in the art. Further, the practical implementation of the described embodiments is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An element of connection between a trim element of a motor vehicle seat element and a cover part, wherein the connection element has a profiled shape having, in cross-section, a first jaw and a second jaw forming a reentrant structure that pinches together an edge of the trim element and an edge of the cover part, the connection element being one piece separate from the trim element and the cover part, wherein the trim element is more rigid than the cover part, wherein the first jaw comprises, at its inner surface, a first longitudinal tooth, wherein the second jaw comprises, at its inner surface, a second longitudinal tooth, wherein a profiled harpoon is fastened to the edge of the cover part for cooperating engagement with the second tooth, and wherein the back side of the trim element comprises a notch for receiving said first tooth.

2. The connection element of claim 1, wherein the second jaw comprises, at its free end, a cord.

3. A system for fastening a cover part to a trim element, comprising a plurality of connection elements of claim 1, along the assembly between the trim element and the cover.

4. The system of claim 3, wherein the trim element is formed of a stack formed at least of a covering material made of textile, of leather, of skin, or of a synthetic material, and of a foam layer on the back side of the covering material.

5. The system of claim 3, further comprising an element for connecting the different connection elements.

6. A motor vehicle seat element comprising the system of claim 3.

7. A motor vehicle seat comprising at least one seat element of claim 6.

\* \* \* \* \*